US011521283B2

(12) United States Patent
Ahmad et al.

(10) Patent No.: US 11,521,283 B2
(45) Date of Patent: Dec. 6, 2022

(54) ASSIGNING A STUDENT TO A COHORT ON A PLATFORM

(71) Applicant: FILO EDTECH INC., Lewes, DE (US)

(72) Inventors: Imbesat Ahmad, Patna (IN); Shadman Anwer, Delhi (IN); Rohit Kumar, Hisar (IN)

(73) Assignee: FILO EDTECH INC., Lewes, DE (US)

( * ) Notice: Subject to any disclaimer, the term of this patent is extended or adjusted under 35 U.S.C. 154(b) by 0 days.

(21) Appl. No.: 17/738,792

(22) Filed: May 6, 2022

(65) Prior Publication Data

US 2022/0284528 A1 Sep. 8, 2022

(30) Foreign Application Priority Data

Feb. 4, 2022 (IN) ............................ 202221006192

(51) Int. Cl.
*G06Q 10/00* (2012.01)
*G06Q 50/20* (2012.01)

(52) U.S. Cl.
CPC .................................. *G06Q 50/205* (2013.01)

(58) Field of Classification Search
CPC .................................................... G06Q 50/205
See application file for complete search history.

(56) References Cited

U.S. PATENT DOCUMENTS

| | | | | |
|---|---|---|---|---|
| 9,432,808 | B1 * | 8/2016 | Reyes | G06Q 50/205 |
| 10,237,256 | B1 * | 3/2019 | Pena | H04L 63/0853 |
| 2014/0335497 | A1 * | 11/2014 | Gal | G09B 7/00 434/323 |
| 2021/0366066 | A1 * | 11/2021 | Davies | G09B 5/14 |

FOREIGN PATENT DOCUMENTS

| | | | | |
|---|---|---|---|---|
| WO | WO-2013142493 A1 * | 9/2013 | | G06F 16/24578 |
| WO | WO-2015047424 A1 * | 4/2015 | | G06Q 50/20 |

OTHER PUBLICATIONS

Huppenkothen D, McFee B, Norén L. Entrofy your cohort: A transparent method for diverse cohort selection. PLoS One. Jul. 27, 2020;15(7):e0231939. doi: 10.1371/joumal.pone.0231939. PMID: 32716929; PMCID: PMC7384611 (Year: 2020).*

* cited by examiner

*Primary Examiner* — Gabrielle A McCormick
(74) *Attorney, Agent, or Firm* — Shumaker, Loop & Kendrick, LLP

(57) ABSTRACT

A system and a method for assigning a student to a cohort in real time on a platform. The system receives a set of information from a student for enrolling the student on the platform. Further, the system receives a question from the student. Furthermore, the system extracts a plurality of parameters from the question based on a machine learning model. Subsequently, the system creates a student profile based on the plurality of parameters and the set of information. Further, the system determines a difficulty level of the question using deep learning algorithms. Furthermore, the system computes a similarity score of the student on the platform in real time. Finally, the system automatically assigns the student to a cohort on the platform. The cohort is a subset of the students on the platform.

10 Claims, 5 Drawing Sheets

300

ASSIGNING A STUDENT TO A COHORT ON A PLATFORM

PRIORITY INFORMATION

The present application claims priority from Indian patent application no 202221006192 filed on 4 Feb. 2022.

TECHNICAL FIELD

The present subject matter described herein, in general, relates to a system and a method for assigning a student to a cohort in real time on a platform.

BACKGROUND

The Corona virus 2019 (Covid-19) pandemic has transformed day to day human life in several ways. From making changes in work culture, lifestyle, to grocery shopping every activity has been required to change and become as contactless as possible. Similarly, the educational system witnessed significant challenges during the pandemic. Conventional arrangement of schools, and colleges in traditional brick and mortar are required to be replaced with a laptop, a desktop or a mobile device. Moreover, continuing teaching and learning during the inconsistent times presented massive challenge equally in front of a teaching faculty as well as for a learning candidate. Consequently, a high demand for providing and seeking online education is seen. However, maintaining a high-quality teaching standard, monitoring progress of the learning candidate, and optimizing the whole process of distance education through electronic media is quite difficult. Therefore, a structured, organized and self-sufficient educational approach ensuring proper education and evaluation is imperative.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for assigning a student to a cohort in real time on a platform. This summary is not intended to identify essential features of the claimed subject matter nor is it intended for use in determining or limiting the scope of the claimed subject matter.

In one implementation, a method for assigning a student to a cohort in real time on a platform is disclosed. Initially, a set of information may be received from a student for enrolling the student on the platform. The set of information may comprise a demographic information, an academic detail, a study time preference, a preferred mode of communication, an aspiration, a study pattern, and a preferred language of learning. It may be understood that the platform connects the student with a tutor in real time for a live one to one interaction. Further, a question may be received from the student. The question may be received in at least an image form, a textual form, and an audio form. Furthermore, a plurality of parameters may be extracted from the question based on a machine learning model. The plurality of parameters may comprise a subject, a topic, a sub-topic, a category, and a language of the question. It may be understood that the question is numerical, conceptual and analytical. Subsequently, a student profile may be created based on the plurality of the parameters and the set of information provided by the student. Further, a difficulty level of the question may be determined using deep learning algorithms. The difficulty level may be determined based on a number of time the question is received on the platform and the plurality of parameters associated to the question. Furthermore, a similarity score of the student on the platform may be computed in real time. The similarity score may be computed based on a comparison of the student profile, the plurality of parameters, and the difficulty level of the question with a set of students enrolled on the platform. Finally, the student may be automatically assigned to a cohort on the platform. The cohort may comprise a subset of the students with the similarity score more than a predefined threshold and the predefined threshold may be based on the topic of the question. In one aspect, the aforementioned method for assigning a student to a cohort in real time on a platform may be performed by a processor using programmed instructions stored in a memory.

In another implementation, a non-transitory computer readable medium embodying a program executable in a computing device for assigning a student to a cohort in real time on a platform is disclosed. The program may comprise a program code for receiving a set of information from a student for enrolling the student on a platform. The set of information may comprise a demographic information, an academic detail, a study time preference, a preferred mode of communication, an aspiration, a study pattern, and a preferred language of learning. The platform may be understood to connect the student with a tutor in real time for a live one to one interaction. Further, the program may comprise a program code for receiving a question from the student. The question may be received in at least an image form, a textual form, and an audio form. Furthermore, the program may comprise a program code for extracting a plurality of parameters from the question based on a machine learning model. The plurality of parameters may be understood to comprise a subject, a topic, a sub-topic, a category, and a language of the question. The question may be numerical, conceptual and analytical. Subsequently, the program may comprise program code for creating a student profile based on the plurality of parameters and the set of information provided by the student. Further, the program may comprise a program code for determining a difficulty level of the question using deep learning algorithms. The difficulty level may be determined based on a number of time the question is received on the platform and the plurality of parameters associated to the question. Furthermore, the program may comprise a program code for computing a similarity score of the student on the platform in real time. The similarity score may be computed based on a comparison of the student profile, the plurality of parameters, and the difficulty level of the question with a set of students enrolled on the platform. Finally, the program may comprise a program code for automatically assigning, the student to a cohort on the platform. The cohort may comprise a subset of the students with the similarity score more than a predefined threshold and the predefined threshold may be based on the topic of the question.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method and system for assigning a student to a cohort in real time on a platform disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

Figure 1:
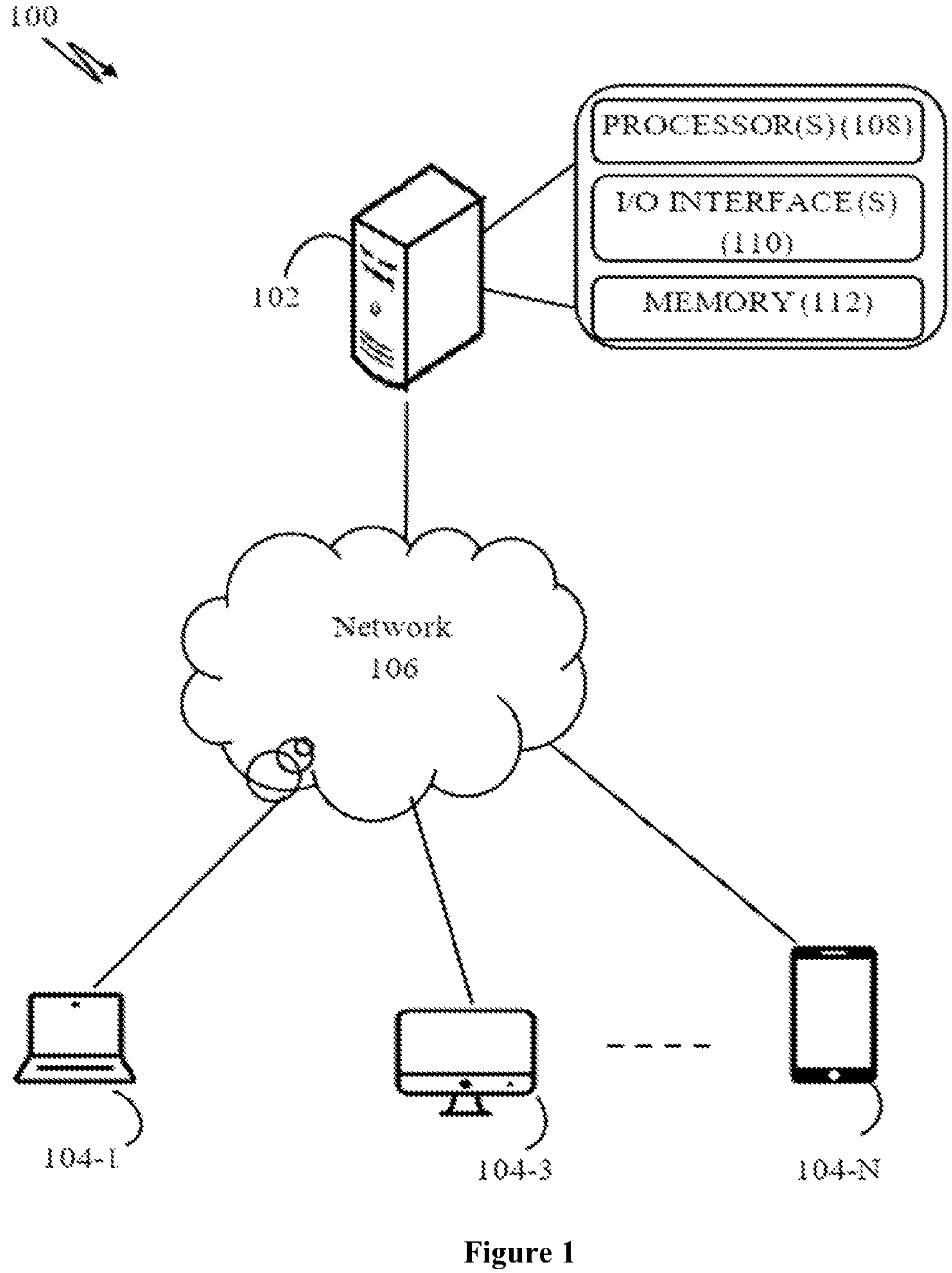
FIG. 1 illustrates a network implementation for assigning a student to a cohort in real time on a platform, in accordance with an embodiment of the present subject matter.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "extracting," "computing," "assigning," and other forms thereof, are intended to be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present subject matter discloses a method and a system for assigning a student to a cohort in real time on a platform. The cohort may be understood as a plurality of students with similar profiles. The aim of the invention is to automatically assign the student to the cohort on the platform. The platform may be understood as an educational platform providing a one to one live interaction between the student and the tutor. The platform helps the student associate with similar students on the platforms and makes the learning experience of the student customized, effective and unbiased.

Initially, the system receives a set of information from a student for enrolling the student on the platform. Further, the system receives a question from the student. Furthermore, the system extracts a plurality of parameters from the question based on a machine learning model. Subsequently, the system creates a student profile based on the plurality of parameters and the set of information. Upon creating the profile, the system determines a difficulty level of the question received from the student using deep learning algorithms. Further, the system computes a similarity score of the student on the platform in real time. Finally, the system automatically assigns the student to a cohort on the platform. The cohort may be a subset of the students on the platform with the similarity score more than a predefined threshold. The predefined threshold is in turn based on the topic of the question.

In an embodiment, the system may assign a student to a cohort in real time on the platform. It may be understood that the student is assigned to a cohort when the student enrolls on the platform for online learning. The platform may have previously enrolled students already assigned in one or more cohorts by the system. The current invention determines a similarity score between a set of students enrolled on the platform and the similarity score is based on several factors. For instance, the similarity score may be based on a comparison of the student profile, a plurality of parameters extracted from a question the student may ask, and a difficulty level of the question. Therefore, the current invention helps to identify appropriate cohort for the student without any bias, and purely on basis of the level of understanding of the students on the platform.

Certain technical challenges exist for achieving the goal of assigning a student to a cohort in real time on a platform. One technical challenge includes automatically and accurately extracting a plurality of parameters from a question asked by the student in real time. The plurality of parameters comprise a subject, a topic, a sub-topic, a category, and a language of the question. The solution presented by the embodiments disclosed herein to address the above challenge is a machine learning model for Natural Language Processing (NLP) techniques. It may be noted that use of one or more machine learning models is required to extract the plurality of parameters from the question. The machine learning model may comprise a Term Frequency—Inverse Document Frequency (TF-IDF), a Support Vector Machine (SVM), a regression model, and a convolutional neural network (CNN). Another technical challenge includes determining, a difficulty level of the question.

The solution presented by the embodiments disclosed herein to address this challenge is determining the difficulty level of the question using deep learning algorithms. It may be understood that the deep learning algorithms, determine the difficulty level of the question based on a number of times the question is received on the platform and the plurality of parameters associated to the question. Another technical challenge includes computing a similarity score for the student on the platform in real time before assigning the student to the cohort on the platform. Conventional methods of assigning the student to the cohort for learning purpose includes random assignment. The solution presented by the embodiments disclosed in the present invention include computing the similarity score of the student based on a comparison of the student profile, the plurality of parameters, and the difficulty level of the question with a set of students enrolled on the platform. Another technical challenge includes assigning the student to the cohort on the platform. The solution presented by the embodiments disclosed herein to address this challenge includes automatically assigning the student to the cohort, such that the cohort comprises a subset of the students with the similarity score more than a predefined threshold. It may be noted that the predefined threshold is based on the topic of the question asked by the student.

Referring now to FIG. 1, a network implementation 100 of a system 102 for assigning a student to a cohort in real time on a platform is disclosed. Initially, the system 102 receives a set of information from a student. In an example, the software may be installed on a user device 104-1. It may be noted that the one or more users may access the system 102 through one or more user devices 104-2, 104-3 . . . 104-N, collectively referred to as user devices 104, hereinafter, or applications residing on the user devices 104. The system 102 receives information from a student from one or more user devices 104. Further, the system may also 102 receive a feedback from a user using the user devices 104.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. It will be understood that the system 102 may be accessed by multiple users through one or more user devices 104-1, 104-2 . . . 104-N. In one implementation, the system 102 may comprise the cloud-based computing environment in which the user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 may include at least one processor 108, an input/output (I/O) interface 110, and a memory 112. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

As there are various challenges observed in the existing art, the challenges necessitate the need to build the system 102 for assigning a student to a cohort in real time on a platform. At first, a user may use the user device 104 to access the system 102 via the I/O interface 110. The user may register the user devices 104 using the I/O interface 110 in order to use the system 102. In one aspect, the user may access the I/O interface 110 of the system 102. The detail functioning of the system 102 is described below with the help of figures.

The present subject matter describes the system 102 for assigning a student to a cohort in real time on a platform. Initially, the system 102 receives a set of information from a student for enrolling on the platform. The set of information may comprise a demographic information, an academic detail, a study time preference, a preferred mode of communication, an aspiration, a study pattern, and a preferred language of learning. In one example, the demographic information may include a name of the student, an identity proof of the student, and a username of the student. In other example, the demographic information may include a date of birth, a contact number, a valid email id of the student. In one example, the student may use a desktop to access the platform. In another example, the student may use a mobile device to access the platform. It may be understood that the student may use multiple devices for accessing the platform.

Further, the academic detail may comprise details about a school, or a college the student may belong to. In one example, the student may belong to a primary school following a state board curriculum. In another example, the student may belong to a secondary school following a central board curriculum. In yet another example, the student may belong to a higher secondary school or a college following an autonomous curriculum.

Furthermore, the student may provide the study time preference to the platform. It is well known that every student may prefer studying during a particular time of day. In one example, the student may prefer early morning hours of a day for study. In another example, the student may prefer evening hours after attending a school for study.

Further, the student may provide the preferred mode of communication. It may be understood that communication may be carried out between a tutor, and one or more students using an email, a voice call, a video call, a conference call and the like. Furthermore, the student may share the aspiration. In one example, the aspiration of the student may be to become an aerospace engineer. In another example, the aspiration of the student may be to become a doctor.

Further, the student may provide details about the study pattern that the student may follow. In one example, the student may prefer to take a quiz test for determining level of preparation of the student. In another example, the student may prefer taking a long test for determining writing capability of the student. In yet another example, the student may attend different lectures before taking any test or examination. Therefore, the study pattern may differ for each of the student enrolling on the platform.

Further, the student may also provide details of the preferred language of learning. In one example, the student may be residing in India and speaking Hindi, English, and French languages. However, the preferred language of learning for the student may be Hindi. In such situation, the student may opt for learning in Hindi on the platform by choosing the preferred language of learning as Hindi.

In one example, the system 102 may receive the set of information in a structured data format. It is to be noted that the system 102 may perform data computations on the structured data format. In one aspect, the system 102 may receive the information in an unstructured data format. Subsequently, the system 102 may perform data cleaning on the unstructured data format to obtain the structured data format. It must be noted that the system 102 may utilize predefined data cleaning algorithms to clean the unstructured data. Further to receiving the set of information from the student, the enrolment process of the student may be completed. In one example, the student may be allocated a username and a login password for accessing the platform for future use.

Further, the system 102 may receive a question from the student after enrolment. The question may be received in at least an image form, a textual form, and an audio form. Further, the system 102 may comprise an image recognition technique to convert the question in the image form to the textual form. Furthermore, the system may comprise an audio recognition technique to convert the audio form question to the textual form.

In one example, the student may capture an image of a flower species unknown to the student and ask the question on the platform asking a right name of the flower species. It may be understood that the student is a Botany enthusiast. In other example, the student may frame the question in the textual form. For example, the student may write a question to ask for name of the flower species by describing a structural feature of the flower, a number of petals on the flower, a colour of the flower, and a height of a plant bearing the flower. In yet another example, the student may record a voice note in the audio form on a mobile device and ask orally about the name of the flower.

Further, the system 102 may extract a plurality of parameters from the question based on a machine learning model. The plurality of parameters that may be extracted by the system 102 comprise a subject, a topic, a sub-topic, a category, and a language of the question. In one example, the student may ask a question about a structural formula of Benzene. In this question, the subject may be identified as Chemistry, the topic may be Organic chemistry, and the sub-topic may be aromatic hydrocarbons.

Further, the category of the question may be either objective, or descriptive. It may be understood that objective question may require short, specific or one word answer. Further, descriptive question may require longer, multiple sentence answer or elaborative answer. Furthermore, the language of the question may be extracted by the machine learning model. It may be understood that the machine learning model may comprise speech recognition module, text recognition module, image recognition module. It may be noted that the question may be numerical, conceptual and analytical in nature. As an example and not by way of limitation, the machine learning model may be based on a support vector machine (SVM). As another example and not by way of limitation, the machine learning model may be based on a regression model. As another example and not by way of limitation, the machine learning model may be based on a deep convolutional neural network (DCNN).

Further to extracting the plurality of parameters from the question, the system 102 may create a student profile based on the plurality of parameters and the set of information provided by the student. The student profile may be understood to be unique for each of the student enrolling on the platform. In one example, the student profile may be edited only by the student. In other example, only some details of the student profile may be viewed by the tutor and other students on the platform.

Further to creating the student profile, a difficulty level of the question may be determined by the system 102 using deep learning algorithms. Examples of the deep learning algorithms include Convolutional Neural Networks (CNN), Recurrent Neural Networks (RNN), and Artificial Neural Networks (ANN). It may be understood that the deep learning algorithms may include a data set of questions. Further, the data set of questions may comprise all possible questions for different topics, subtopics, subjects available for learning on the platform. The difficulty level for each of the question in the data set may be first determined by the deep learning algorithm and verified manually in initial stage. Furthermore, a new question asked by the student on the platform may be added to the dataset of questions. The system 102 may calculate the difficulty level of the new question based on the deep learning algorithms, and the difficulty level of the questions in the data set of questions.

Further, the difficulty level may be determined based upon a number of time the question is received on the platform. It may be understood that an easy question may be asked for higher times on the platform. Likewise, a difficult question may be asked for lesser times on the platform. Further, the system 102 may also determine the difficulty level of the question based on the plurality of parameters associated to the question.

In one example, a question being objective in nature may be considered as an easy question if it has been received on the platform many times before as well from different students. In other example, an analytical and a conceptual question may be difficult if it was never received on the platform by any student. In one example the difficulty level may be determined on a scale of 0 to 10 by the system 102. In other example, the difficulty level may be determined, and the question may be labelled as an easy question, a difficult question, and a complex question by the system 102. In yet another example, the difficulty level may be computed and regarded as high, medium and low.

Further to determining the difficulty level, a similarity score may be computed by the system 102. The similarity score may be based on a comparison of the student profile, the plurality of parameters, and the difficulty level of the question with a set of students enrolled on the platform. For instance, the similarity score may be given on a scale of 1 to 10, wherein similarity increases with increase in numerical value, i.e. 1 is least similarity score and 10 is highest similarity score. In one example, there may be three students—A, B, and C enrolled on the platform, where the A and B students ask question related to gravity and gravitational pull respectively. Further, the C student may ask question related to atomic energy.

Further, the system 102 may compare the plurality of parameters, the student profiles, and the difficulty level of the question asked by each of the student A, B, and C. Further, the system 102 may compute the similarity score for each of the student. The similarity score for the students A and B may be computed as 08, while the similarity score of A and C may be computed as 04, and the similarity score of B and C may be computed as 03. Here, the similarity score of the students A and B is higher as compared to the similarity score of A and C, and B and C.

Upon computing the similarity score of the students on the platform in real time, the system 102 may automatically assign the student to a cohort on the platform. The cohort may be understood as a group of students. Particularly, the platform may have a set of students enrolled. Further, the cohort may be a subset of the students enrolled on the platform with the similarity score more than a predefined threshold. It may be pertinent to note that the predefined threshold may be based on the topic of the question asked by the student. Referring to the previous example of the students A, B and C, where the similarity scores of A and B is 08, A and C is 04, and B and C is 03. Further, the student A asked question about the gravity, B asked question about the gravitational pull, and C asked question about the atomic energy. Further, the predefined threshold of the similarity score may be 05. Therefore, the system 102 may automatically assign the students A and B to a same cohort on the platform, and the student C may be assigned to another cohort based on the topic of the question.

Further, the system 102 may similarly assign one or more tutor to the cohort of the student through artificial intelligence. The artificial intelligence may be based on the deep learning algorithms. It may be noted that the platform may have multiple cohorts of students and multiple tutors. In initial stage of the platform, the system 102 may match various tutor profiles with the student profiles in the cohort before assigning the tutor to the cohort. The assigning may be done on basis of several parameters of the students and the tutor such as the subject of interest, the time of learning/teaching, the language of preference and so on. During operation, the system 102 may collect data related to performance of the students in the cohorts and the tutors assigned to the cohorts. Further, the deep learning algorithms may help the system 102 to identify a new tutor profile most suitable for one or more cohorts depending on the performance data of the cohorts and the tutors with a similar profile to the new tutor's profile. It may be noted that the deep learning algorithms include the CNN, the RNN, and the ANN.

Furthermore, the system 102 may monitor a performance of the student in the cohort. The performance may be based upon a feedback from the tutor teaching the students in the cohort, a short test score, a long test score, and a conceptual understanding analysis. Referring again to the previous example of the students A, B, and C. The system 102 may monitor the performance of the students A and B in the same cohort from a tutor X assigned to the cohort. During learning the tutor X may coach the students A and B in multiple lectures, answering multiple questions asked by the students A and B time to time. Further, the tutor X may also design some tests for the students. The test may be a short test and a long test. The short test may comprise only Multiple Choice Questions (MCQs) wherein the student may be provided 4 alternatives to choose one answer. Further, the long test may comprise descriptive questions, which may require the student to write answer in 200 to 250 words at least. The system 102 may monitor the performance of each of the student A and B in all tests that may be taken by the students over a period of time.

Further, the system 102 may also monitor the conceptual understanding analysis of the students A and B. The conceptual understanding analysis may analyse the type of questions asked by each of the student. It may be understood that the question may arise due to confusion in one or more related concepts. In other words, every question may be understood to be indirectly related to a knowledge possessed by the student about the concept which the student is learning about. Therefore, if the student is in preliminary stage of learning the question asked by the student may be common or basic in nature as the knowledge is lesser in the preliminary stage. However, after couple of months of learning on the platform, the question asked by the student may be difficult or complicated in nature as compared to the basic question asked before by the student. This difference in the question may be understood to link with the conceptual understanding. In one example, more the conceptual understanding, more may be the difficulty of the question asked.

While monitoring the performance of the student in the cohort, the system 102 may change the cohort of the student. The change may be dependent on the performance of the student. In one example, the performance of the student may improve, remain same, and weaken over a period of time due to several factors. The system 102 may monitor performance of the student and change the cohort of the student in case a stagnant and weak performance is identified. In another example, the performance of the student may reach a maximum excellence in a particular topic being taught in the cohort of the student. Further, the student may be required to change the cohort to begin learning another topic. In such scenario also, the system 102 may assign the student to a new cohort where the another topic may be taught by another tutor Y. It may be understood that the student may be assigned to multiple cohorts for learning multiple topics being taught by multiple tutors.

Further, the system 102 may provide a progress report to the student in real time. The progress report may be based upon the performance of the student. The progress report may indicate a preparation level, an understanding pattern, a learning time, and a learning approach of the student. In one example, the system 102 may provide a progress report for the student A. The progress report may indicate a preparation level of the student A for a competitive examination the student A is supposed to be taking in a year. The system 102 may help the student A understand the preparation level with respect to the days left for the competitive examination. If the progress report indicates 80% preparation level for the student A three months before the competitive examination. Therefore, the student may plan the remaining three months effectively to achieve 100% preparation level in the progress report before taking the competitive examination.

It may be understood that the progress report may be provided on a periodic basis. In one example, the system 102 may provide the progress report on a monthly basis for all subjects being learned by the student on the platform. In another example, the system 102 may provide the progress report on a weekly basis if the student chooses to track the progress weekly. In yet another example, the system 102 may provide the progress report biannually and annually per the requirement of the student.

Consider an example, wherein four students Peter, Sara, John and Dave are enrolled on the platform. Initially, the system 102 may receive a set of information from Peter, Sara, John and Dave. The set of information may comprise a demographic information, an academic detail, a study time preference, a preferred mode of communication, an aspiration, a study pattern, and a preferred language of learning for all four of the students. Further, the system 102 may receive a question from each of the four students. Peter asks a question about plant biology, Sara asks a question about magnetism, John asks a question about plant classification, and Dave asks a question about magnetic field. Further, the study time preference may match for Peter and John while the study time preference of Sara and Dave may be flexible. Post receiving the question from each of the four students, the system 102 may extract a plurality of parameters from the question based on a machine learning model.

Further, the system 102 may create a profile for each of the student and determine a difficulty level for the question using deep learning algorithms. The difficulty level for the question asked by Peter and John may be low and the difficulty level for the question asked by Sara and Dave may be high. Furthermore, the system may compute a similarity score for each of the student in real time on a scale of 1 to 10. The similarity score may be computed as:—Peter and Sara=03, Peter and John=08, Peter and Dave=01, John and Sara=02, Sara and Dave=07, and John and Dave=01. Finally, the system 102 may assign Peter and John in a first cohort of the students on the platform, and Sara and Dave in a second cohort of the students on the platform. Furthermore, the system 102 may assign a tutor Paul and Ray to the first cohort and the second cohort respectively. The topic of interest for Paul may be plant biology and the topic of interest for Ray may be physics.

It may be understood from the above paragraphs of description, and the examples, that the present invention is a completely automated, unbiased, and artificially intelligent alternative for assigning the student to the cohort on the platform. The manner in which the present invention works may not be directly or indirectly compared or applied to any traditional manually operated methods. It may be pertinent to note that the system 102 extracts the plurality of parameters from the question received from the student based on the machine learning model. Further, the system 102 may perform this extraction within a minimum possible time with a maximum possible accuracy. The traditional manually operated methods may not be able to extract the plurality of parameters within the minimum possible time, with the maximum possible accuracy. Also, there may be an unavoidable bias introduced in the extraction due to the human involvement. In one example, 100 questions may be asked by 100 separate students on the platform, and the system 102 may extract the plurality of parameters, determine the difficulty level of the question, compute the similarity score of the student on the platform in real time for all 100 students. This may be possible due to a manifold reduction of an operation time due to the system 102, the deep algorithms and the machine learning models. Finally, the system 102 may automatically assign the student to a cohort on the platform based on the similarity score. It may be understood that it is absolutely impossible for any human or a group of human to perform all the above mentioned steps in real time using natural intelligence.

Figure 2:
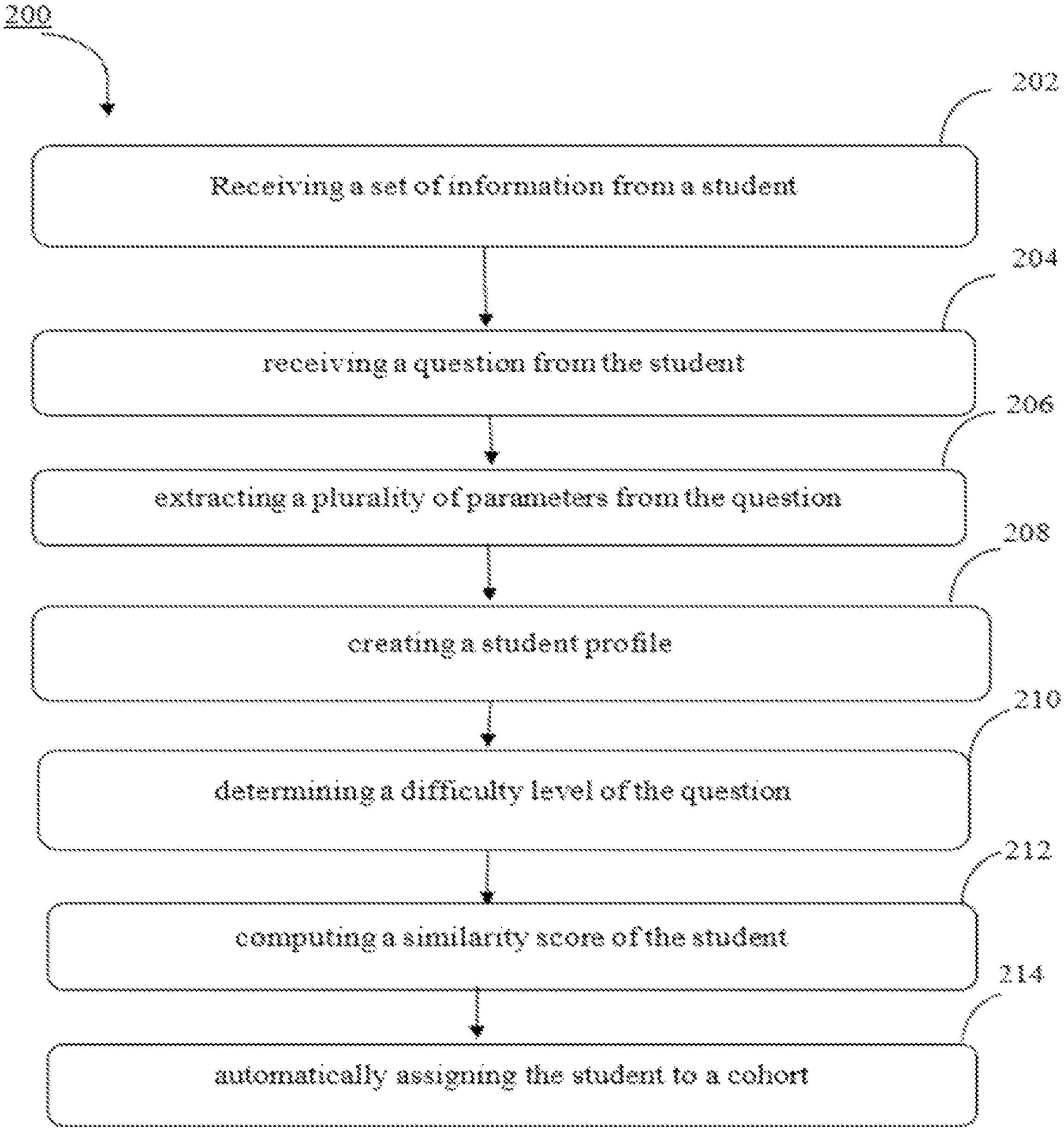
FIG. 2 illustrates a method for assigning a student to a cohort in real time on a platform, in accordance with an embodiment of the present subject matter.

Referring now to FIG. 2, a method 200 for assigning a student to a cohort in real time on a platform is shown, in accordance with an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The order in which the method 200 is described is not intended to be construed as a limitation, and any number of the described method blocks can be combined in any order to implement the method 200 or alternate methods for assigning a student to a cohort in real time on a platform. Additionally, individual blocks may be deleted from the method 200 without departing from the scope of the subject matter described herein. Furthermore, the method 200 for assigning the student to the cohort in real time on a platform can be implemented in any suitable hardware, software, firmware, or combination thereof. However, for ease of explanation, in the embodiments described below, the method 200 may be considered to be implemented in the above-described system 102.

At block 202, a set of information from a student may be received. The set of information may comprise a demographic information, an academic detail, a study time preference, a preferred mode of communication, an aspiration, a study pattern, and a preferred language of learning. It may be understood that the platform connects the students with a tutor in real time for a live one to one interaction.

At block 204, a question from the student may be received. The question may be received in at least an image form, a textual form, and an audio form.

At block 206, a plurality of parameters from the question may be extracted based on a machine learning model. The plurality of parameters may comprise a subject, a topic, a sub-topic, a category, a language of the question. It may be understood that the question is numerical, conceptual, and analytical.

At block 208, a student profile may be created based on the plurality of parameters and the set of information provided by the student.

At block 210, a difficulty level of the question may be determined using deep learning algorithms. The difficulty level may be determined based on a number of time the question is received on the platform, and the plurality of parameters associated to the question.

At block 212, a similarity score of the student on the platform may be computed in real time. The similarity score may be computed based on a comparison of the student profile, the plurality of parameters, and the difficulty level of the question with a set of students enrolled on the platform.

At block 214, the student may be automatically assigned to a cohort on the platform. The cohort may be understood to comprise a subset of the students with the similarity score more than a predefined threshold. The predefined threshold may be based on the topic of the question.

Figure 3:
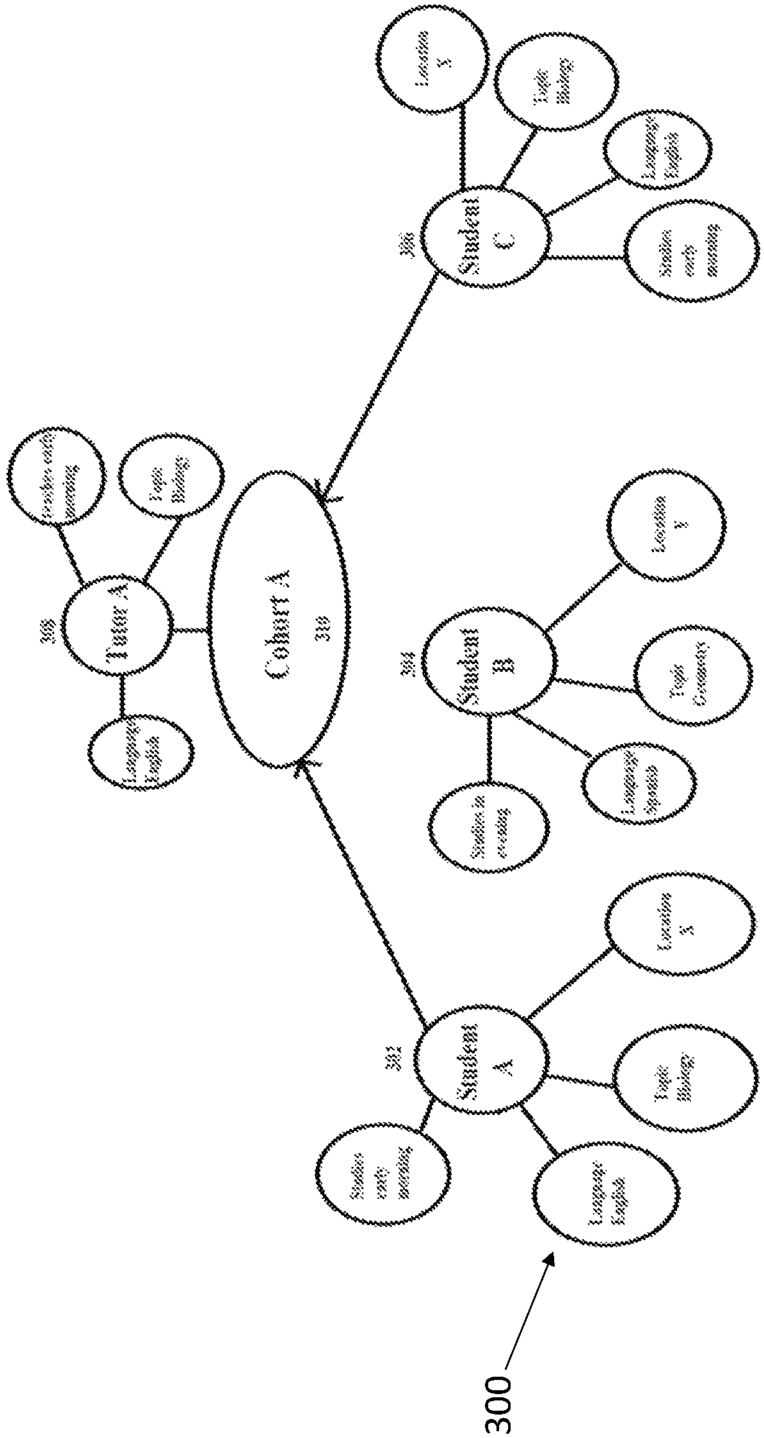
FIG. 3 illustrates an exemplary embodiment of the present invention for assigning a student to a cohort on a platform.

FIG. 3 illustrates an exemplary embodiment 300 of the present invention for assigning three students namely a student A 302, a student B 304 and a student C 306 to a cohort on a platform. Initially, a set of information may be received from a student for enrolling the student on the platform. The set of information may comprise a demographic information, an academic detail, a study time preference, a preferred mode of communication, an aspiration, a study pattern, and a preferred language of learning. The student A 302 may be keen in learning topic Biology, based at a location X, study time preference may be early morning and the preferred language for learning may be English. Further, the student B 304 may be keen in learning topic Geometry, based at a location Y, study time preference may be evening and the preferred language for learning may be Spanish.

Furthermore, the student C 306 may be keen in learning topic Biology, based at a location X, study time preference may be early morning and the preferred language for learning may be English. Further, a question may be received from the student A 302, the student B 304 and the student C 306. The questions may be received in at least an image form, a textual form, and an audio form. Furthermore, a plurality of parameters may be extracted from the questions based on a machine learning model. The plurality of parameters may comprise a subject, a topic, a sub-topic, a category, and a language of the question. It may be understood that the question is numerical, conceptual and analytical. Subsequently, a student profile may be created based on the plurality of the parameters and the set of information provided by each of the student A 302, the student B 304 and the student C 306.

Further, a difficulty level of the questions may be determined using deep learning algorithms. The difficulty level may be determined based on a number of time the question is received on the platform and the plurality of parameters associated to the question. Furthermore, a similarity score of the student A 302, the student B 304 and the student C 306 on the platform may be computed in real time. The similarity score may be computed based on a comparison of the student profile, the plurality of parameters, and the difficulty level of the question with a set of students enrolled on the platform. It may be understood that the similarity score of the student A 302 and the student C 306 may be high.

Finally, the student A 302 and the student C 306 may be automatically assigned to a cohort A 310 on the platform. The cohort A 310 may comprise a subset of the students with the similarity score more than a predefined threshold and the predefined threshold may be based on the topic of the question. Further, a tutor A 308 may be teaching each of the student in the cohort A 310. The tutor A 308 may be keen on teaching the topic Biology, the preferred time of teaching may be early morning and the preferred language may be English. Therefore, the student A 302 and the student C 306 may be assigned to the cohort A 310 and taught by the tutor A 308.

Figure 4:
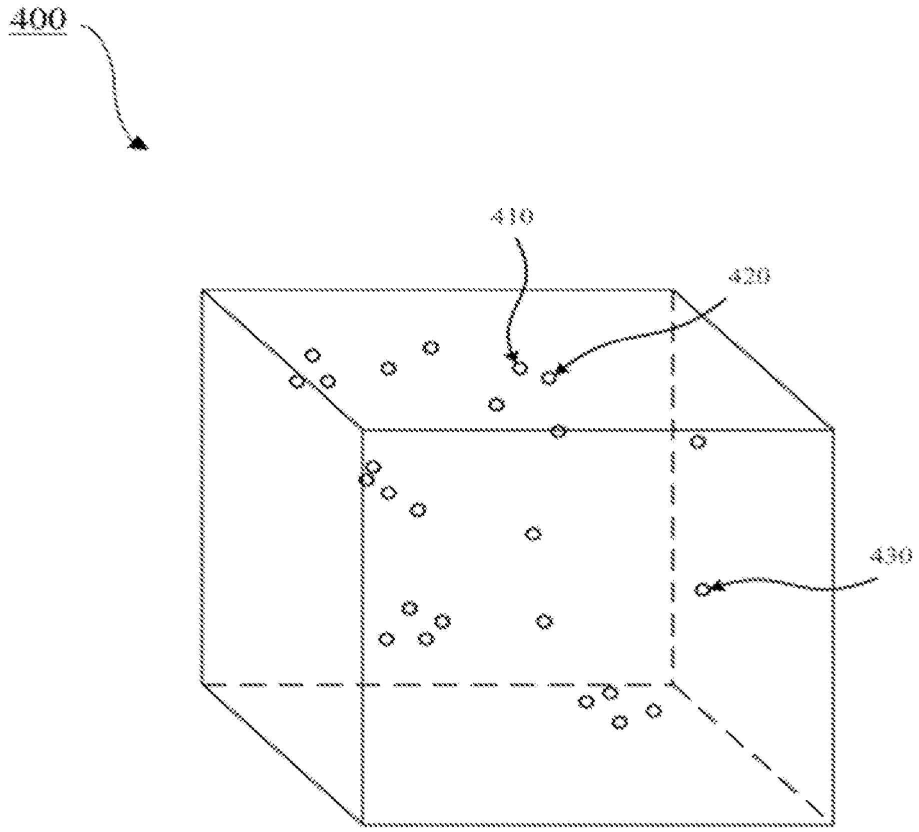
FIG. 4 illustrates an exemplary view of an embedding space in accordance with the present invention.

FIG. 4 illustrates an example view of a vector space 400. In particular embodiments, an object or an n-gram may be represented in a d-dimensional vector space, where d denotes any suitable number of dimensions. Although the vector space 400 is illustrated as a three-dimensional space, this is for illustrative purposes only, as the vector space 400 may be of any suitable dimension. In particular embodiments, an n-gram may be represented in the vector space 400 as a vector referred to as a term embedding. Each vector may comprise coordinates corresponding to a particular point in the vector space 400 (i.e., the terminal point of the vector). As an example and not by way of limitation, vectors 410, 420, and 430 may be represented as points in the vector space 400, as illustrated in FIG. 4.

As an example and not by way of limitation, a dictionary trained to map text to a vector representation may be utilized, or such a dictionary may be itself generated via training. As another example and not by way of limitation, a model, such as Word2vec, may be used to map an n-gram to a vector representation in the vector space 400. In particular embodiments, an n-gram may be mapped to a vector representation in the vector space 400 by using a machine leaning model (e.g., a neural network). The machine learning model may have been trained using a sequence of training data (e.g., a corpus of objects each comprising n-grams).

In particular embodiments, an object may be represented in the vector space 400 as a vector referred to as a feature vector or an object embedding. In particular embodiments, an object may be mapped to a vector based on one or more properties, attributes, or features of the object, relationships of the object with other objects, or any other suitable information associated with the object.

As an example and not by way of limitation, an object comprising a video or an image may be mapped to a vector by using an algorithm to assign a student to a cohort on a platform. Features used to calculate the vector may be based on information obtained from edge detection, corner detection, blob detection, ridge detection, scale-invariant feature transformation, edge direction, changing intensity, auto correlation, motion detection, optical flow, thresholding, blob extraction, template matching, Hough transformation (e.g., lines, circles, ellipses, arbitrary shapes), or any other suitable information.

As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. Although this disclosure describes representing an n-gram or an object in a vector space in a particular manner, this disclosure contemplates representing an n-gram or an object in a vector space in any suitable manner.

In particular embodiments, the system 102 may calculate a similarity metric of vectors in vector space 400. The similarity metric may be a cosine similarity, a Minkowski distance, a Mahalanobis distance, a Jaccard similarity coefficient, or any suitable similarity metric. The similarity metric of two vectors may represent how similar the two objects or n-grams corresponding to the two vectors, respectively, are to one another, as measured by the distance between the two vectors in the vector space 400. As an example and not by way of limitation, vector 410 and vector 420 may correspond to objects that are more similar to one another than the objects corresponding to vector 410 and vector 430, based on the distance between the respective vectors. Although this disclosure describes calculating a similarity metric between vectors in a particular manner, this disclosure contemplates calculating a similarity metric between vectors in any suitable manner.

Figure 5:
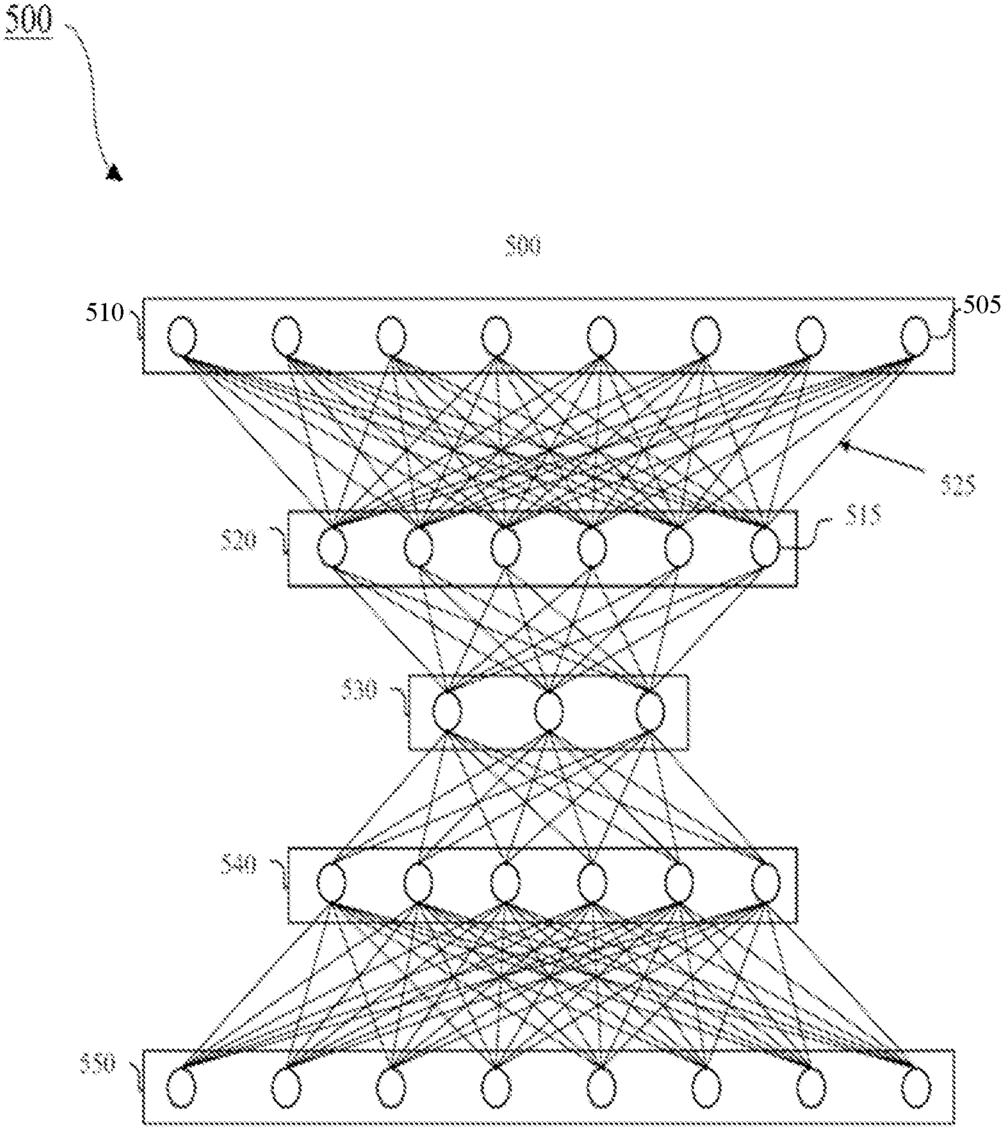
FIG. 5 illustrates an exemplary artificial neural network in accordance with the present invention.

Referring now to FIG. 5 illustrating an example artificial neural network ("ANN") 500 of the deep learning algorithms. In particular embodiments, an ANN may refer to a computational model comprising one or more nodes. Example ANN 500 may comprise an input layer 510, hidden layers 520, 530, 560, and an output layer 550. Each layer of the ANN 500 may comprise one or more nodes, such as a node 505 or a node 515. In particular embodiments, each node of an ANN may be connected to another node of the ANN. As an example and not by way of limitation, each node of the input layer 510 may be connected to one of more nodes of the hidden layer 520.

In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 5 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 5 depicts a connection between each node of the input layer 510 and each node of the hidden layer 520, one or more nodes of the input layer 510 may not be connected to one or more nodes of the hidden layer 520.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 520 may comprise the output of one or more nodes of the input layer 510. As another example and not by way of limitation, the input to each node of the output layer 550 may comprise the output of one or more nodes of the hidden layer 560. In particular embodiments, the ANN may be a deep neural network (e.g., a neural network comprising at least two hidden layers). In particular embodiments, the ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be $F(x)+x$, where $F(x)$ may be the output of residual block $N-1$, $x$ may be the input into residual block $N-1$. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function.

In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 525 between the node 505 and the node 515 may have a weighting coefficient of 0.4, which may indicate that 0.4 multiplied by the output of the node 505 is used as an input to the node 515. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, the ANN may be trained using training data. As an example and not by way of limitation, training data may comprise inputs to the ANN 500 and an expected output. As another example and not by way of limitation, training data may comprise vectors each representing a training object and an expected label for each training object. In particular embodiments, training the ANN may comprise modifying the weights associated with the connections between nodes of the ANN by optimizing an objective function.

As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, the ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training the ANN in a particular manner, this disclosure contemplates training the ANN in any suitable manner.

Exemplary embodiments discussed above may provide certain advantages. Though not required to practice aspects of the disclosure, these advantages may include those provided by the following features.

Some embodiments of the system and the method promote effective and focused learning for the students.

Some embodiments of the system and the method enable the students to associate with similar students in the cohort and simplify the learning experience for the student.

Some embodiments of the system and the method help the student to evaluate their academic performance in real time.

Some embodiments of the system and the method enable the student to learn as per the language of preference, time of preference, and level of understanding.

Some embodiments of the system and the method enable continuous learning of the model in order to assign the student in a most related cohort.

Although implementations for methods and system for assigning a student to a cohort in real time on a platform have been described in language specific to structural features and/or methods, it is to be understood that the appended claims are not necessarily limited to the specific features or methods described. Rather, the specific features and methods are disclosed as examples of implementations for assigning a student to a cohort.

The invention claimed is:

1. A method for assigning a student to a cohort in real time on a platform, the method comprises:

receiving, by a processor, a set of information from a student for enrolling the student on a platform, wherein the set of information comprises a demographic information, an academic detail, a study time preference, a preferred mode of communication, an aspiration, a study pattern, and a preferred language of learning, and wherein the platform connects the student with a tutor in real time for a live one to one interaction;

receiving, by the processor, a question from the student, wherein the question is received in at least an image form, a textual form, and an audio form;

extracting, by the processor, a plurality of parameters from the question based on a machine learning model, wherein the plurality of parameters comprises a subject, a topic, a sub-topic, a category, and a language of the question, and wherein the question is at least numerical, conceptual and analytical;

creating, by the processor, a student profile based on the plurality of parameters and the set of information provided by the student;

determining, by the processor, a difficulty level of the question using deep learning algorithms, wherein the difficulty level is determined based on a number of times the question is received on the platform and the plurality of parameters associated to the question;

computing, by the processor, a similarity score of the student on the platform in real time, wherein the similarity score is computed based on a comparison of the student profile, the plurality of parameters, and the difficulty level of the question with a set of students enrolled on the platform; and automatically assigning, by the processor, the student to a cohort on the platform, wherein the cohort comprises a subset of the students with the similarity score more than a predefined threshold, and wherein the predefined threshold is based on the topic of the question.

2. The method as claimed in claim 1, further comprises:

monitoring a performance of the student in the cohort, wherein the performance is based upon a feedback from the tutor teaching the students in the cohort, a short test score, a long test score, and a conceptual understanding analysis;

changing the cohort of the student, wherein the change is dependent on the performance of the student; and providing a progress report to the student in real time, wherein the progress report is based upon the performance of the student, and wherein the progress report indicates a preparation level, an understanding pattern, a learning time, and a learning approach of the student.

3. The method as claimed in claim 1, wherein the set of information received from the student is in a structured data format.

4. The method as claimed in claim 1, wherein an image recognition technique is used to convert the question in the image form to the textual form, and wherein an audio recognition technique is used to convert the question in the audio form to the text form.

5. The method as claimed in claim 1, wherein one or more tutors are assigned to the cohort through artificial intelligence, and wherein the artificial intelligence is based on deep learning algorithms.

6. A system for assigning a student to a cohort in real time on a platform, the system compromising:

a memory; and a processor coupled to the memory, wherein the processor is configured to execute program instructions stored in the memory for:

receiving a set of information from a student for enrolling the student on a platform, wherein the set of information comprises a demographic information, an academic detail, a study time preference, a preferred mode of communication, an aspiration, a study pattern, and a preferred language of learning, and wherein the platform connects the student with a tutor in real time for a live one to one interaction;

receiving a question from the student, wherein the question is received in at least an image form, a textual form, and an audio form;

extracting a plurality of parameters from the question based on a machine learning model, wherein the plurality of parameters comprises a subject, a topic, a sub-topic, a category, and a language of the question, and wherein the question is at least numerical, conceptual and analytical;

creating a student profile based on the plurality of parameters and the set of information provided by the student;

determining a difficulty level of the question using deep learning algorithms, wherein the difficulty level is determined based on a number of times the question is received on the platform and the plurality of parameters associated to the question;

computing a similarity score of the student on the platform in real time, wherein the similarity score is computed based on a comparison of the student profile, the plurality of parameters, and the difficulty level of the question with a set of students enrolled on the platform; and automatically assigning, the student to a cohort on the platform, wherein the cohort comprises a subset of the students with the similarity score more than a predefined threshold, and wherein the predefined threshold is based on the topic of the question.

7. The system as claimed in claim 6, further comprising:

monitoring a performance of the student in the cohort, wherein the performance is based upon a feedback from the tutor teaching the students in the cohort, a short test score, a long test score, a conceptual understanding analysis;

changing the cohort of the student, wherein the change is dependent on the performance of the student; and providing a progress report to the student in real time, wherein the progress report is based upon the performance of the student, and wherein the progress report indicates a preparation level, an understanding pattern, a learning time, and a learning approach of the student.

8. The system as claimed in claim 6, wherein the set of information received from the student is in a structured data format.

9. The system as claimed in claim 6, wherein one or more tutors are assigned to the cohort through an artificial intelligence, and wherein the artificial intelligence is based on deep learning algorithms.

10. A non-transitory computer program product having embodied thereon a computer program for assigning a student to a cohort in real time on a platform, the computer program product storing instructions for:

receiving a set of information from a student for enrolling the student on a platform, wherein the set of information comprises a demographic information, an academic detail, a study time preference, a preferred mode of communication, an aspiration, a study pattern, and a preferred language of learning, and wherein the platform connects the student with a tutor in real time for a live one to one interaction;

receiving a question from the student, wherein the question is received in at least an image form, a textual form, and an audio form;

extracting a plurality of parameters from the question based on a machine learning model, wherein the plurality of parameters comprises a subject, a topic, a sub-topic, a category, and a language of the question, and wherein the question is at least numerical, conceptual and analytical;

creating a student profile based on the plurality of parameters and the set of information provided by the student;

determining a difficulty level of the question using deep learning algorithms, wherein the difficulty level is determined based on a number of times the question is received on the platform and the plurality of parameters associated to the question;

computing a similarity score of the student on the platform in real time, wherein the similarity score is computed based on a comparison of the student profile, the plurality of parameters, and the difficulty level of the question with a set of students enrolled on the platform; and automatically assigning, the student to a cohort on the platform, wherein the cohort comprises a subset of the students with the similarity score more than a predefined threshold, and wherein the predefined threshold is based on the topic of the question.

* * * * *